UNITED STATES PATENT OFFICE.

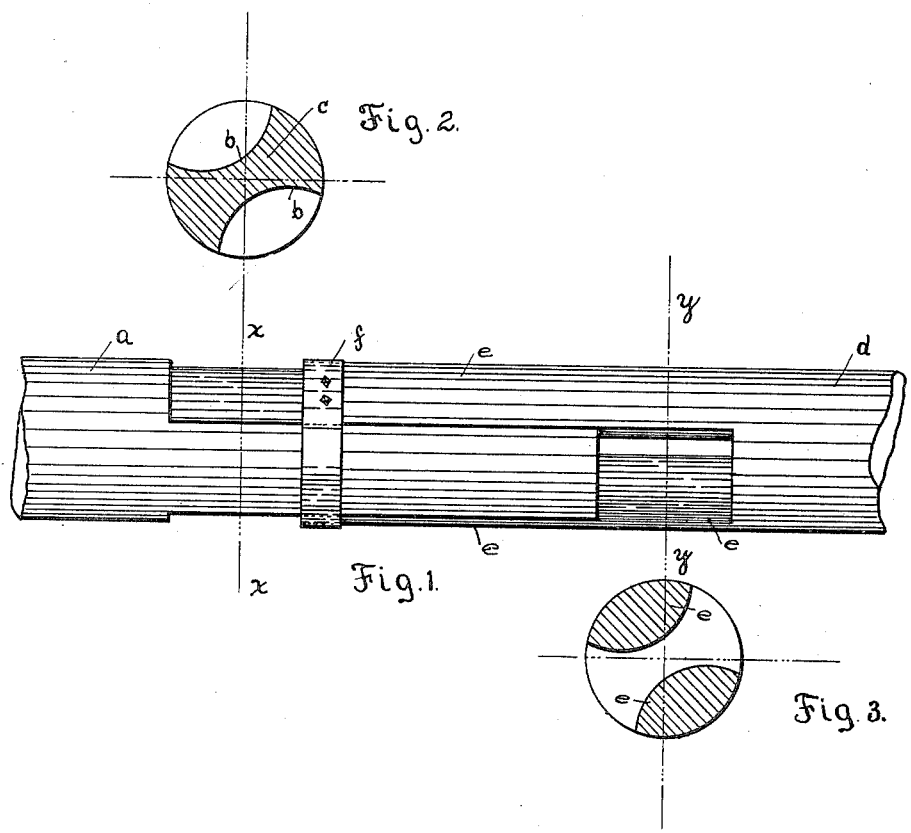

WILLIAM SPARROW, OF BAY CITY, MICHIGAN, ASSIGNOR TO THE MICHIGAN SHADE ROLLER AND BOX COMPANY, OF SAME PLACE.

JOINT FOR SHADE-ROLLERS, &c.

SPECIFICATION forming part of Letters Patent No. 668,063, dated February 12, 1901.

Application filed April 18, 1900. Serial No. 13,285. (No model.)

*To all whom it may concern:*

Be it known that I, WILLIAM SPARROW, a citizen of the United States, residing at Bay City, in the county of Bay and State of Michigan, have invented certain new and useful Improvements in Joints for Shade-Rollers, &c.; and I do hereby declare the following to be a full, clear, and exact description of the invention, such as will enable others skilled in the art to which it appertains to make and use the same.

My invention relates to curtain-rollers; and the invention consists in the construction and operation of the improved joint or splice for such rollers, which is set forth in this specification.

One object is to produce a shade-roller that shall be capable of extension to suit windows of different widths and to so construct the extension-joint that the stiffness and strength of the solid roller are in great measure retained in the joint.

Another object is to produce a joint that can be easily, quickly, and cheaply made without necessitating the use of screws or bolts to hold it together.

The means by which I accomplish these objects is shown in the accompanying drawings, throughout the several views of which similar letters of reference designate corresponding parts.

Figure 1 is a perspective view of a part of a shade-roller, showing the joint extended. Fig. 2 is a section taken on the line $x$ $x$ of Fig. 1, and Fig. 3 is a section taken on the line $y$ $y$ of Fig. 1.

As is clearly shown in the drawings, the device consists in a joint formed by concaving one section of the roller $a$ so as to form diametrically opposite grooves $b$, of circular or approximately circular section, that extend from the end of the piece $a$ back a sufficient distance to form a suitable joint. The center or heart of the stick $c$ is left intact, thereby retaining a great part of its strength. The end of the other section $d$ of the roller is cut away in exactly the reverse manner—that is, the middle portion is cut away and two inwardly-curved and diametrically opposite tongues $e$ are thus formed. The inner surfaces of the tongues $e$ fit the concaved grooves $b$ and slide longitudinally thereon without any rotary movement, thus insuring proper alinement of the roller, whether the joint is extended or closed. To further strengthen the ends of the tongues $e$, I prefer to slip a band $f$ over them and to secure the band in place by indenting it into the wood by means of a pointed tool. The band $f$ may be of any suitable material or construction; but I have found short lengths of seamless brass tube to serve the purpose excellently in practice. The band or strip $f$ prevents the tongues $e$ from springing or separating when the roller is extended and heavily loaded.

It will be noticed that the working joint of the roller consists of but three pieces, each of which is of the proper form to give greatest strength. This feature is of great importance, for a joint of the kind described is much stronger than a joint of the same size made up of four or more separate parts.

In manufacturing shade-rollers it is desirable to utilize short pieces and to cut the straight part from a warped stick and splice it to another stick. By means of the form of joint herein described this can be done neatly and economically, the parts being joined by glue and becoming practically as strong as the solid stick. The form of joint renders it unnecessary to bind the stick while drying, and the dowel-pins usually employed are dispensed with.

The cheapness and quickness with which shade-rollers can be produced when this form of joint is used is readily evident when it is considered that the two convexed faces of the tongues $e$ $e$ can be formed at one operation by advancing the stick axially upon two parallel cylinder-saws. The oppositely-concaved surfaces of the central tongue $c$ are formed in the same way upon another pair of parallel cylinder-saws of slightly larger diameter than the first pair to allow for the width of the kerf. The waste pieces are easily detached by mechanically-operated chisels. It is thus seen that the cylindrically concaved and convexed forms of telescoping tongues not only add to the strength and neatness of the tongues by avoiding sharp angles, but such form makes it possible to manufacture the joints with extreme rapidity and cheapness by simple mechanism.

What I claim is—

1. A joint for uniting two sections of a roller, comprising a tongue cylindrically concaved on its opposite sides and extending from the end of one section; two diametrically opposite cylindrically-convexed tongues extending from the end of the other section; the two tongues of the second section being adapted to telescope with the single tongue of the first section, substantially as described.

2. In an extension-joint for shade-rollers and similar articles consisting of two sections, the combination of a single central tongue formed at the end of one section and having its opposite sides cylindrically concaved; a pair of tongues formed at the end of the other section and having their inner faces cylindrically convexed and adapted to engage the concaved sides of the central tongue, together with a thin metal band that surrounds the ends of the pair of tongues and is secured to them by being indented therein.

In testimony whereof I affix my signature in presence of two witnesses.

WILLIAM SPARROW.

Witnesses:
WILFRED SPARROW,
WM. STEPHENS.